Patented Oct. 21, 1952

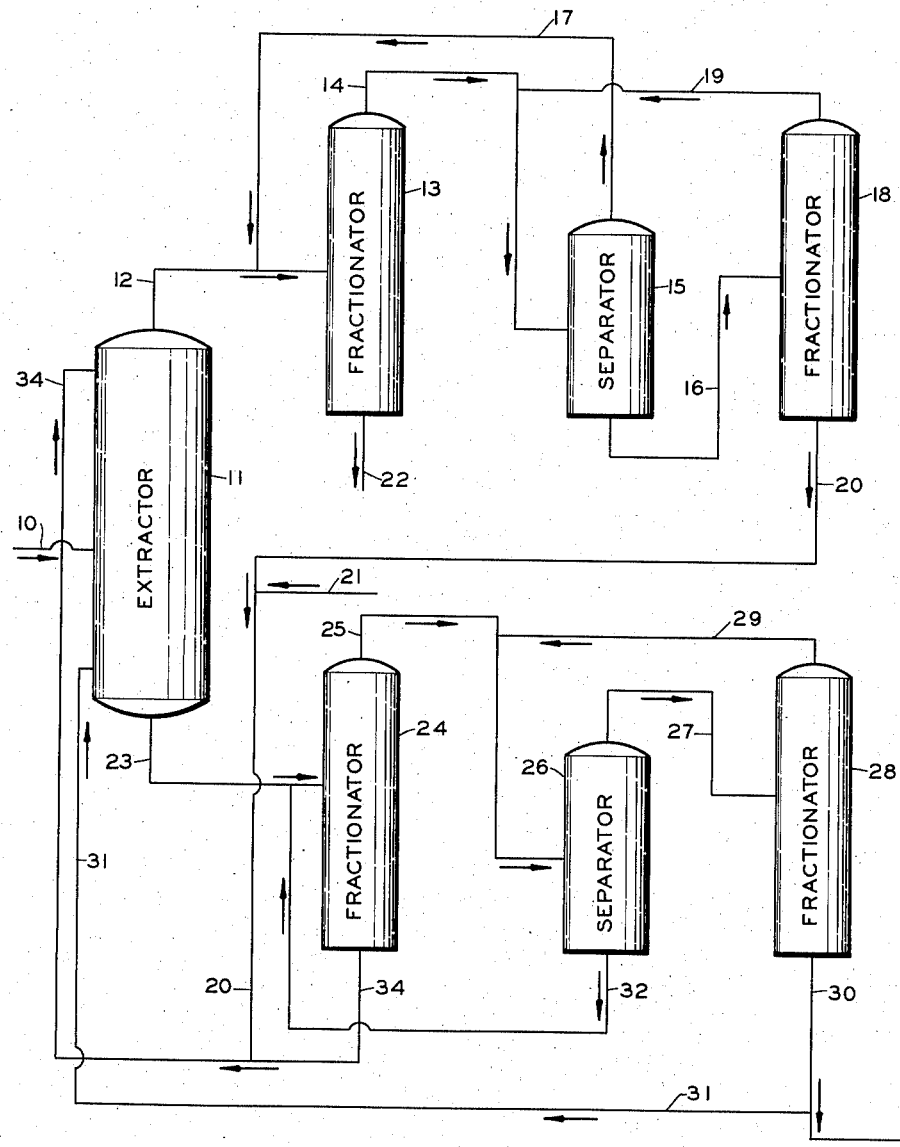

2,614,965

UNITED STATES PATENT OFFICE 2,614,965

SOLVENT EXTRACTION OF HYDROCARBONS WITH FLUORINATED ALIPHATIC CARBOXYLIC ACIDS

Forrest N. Ruehlen, Bartlesville, Okla., assignor to Phillips Petroleum Company, a corporation of Delaware Application July 28, 1950, Serial No. 176,466

13 Claims. (Cl. 196—14.3)

This invention relates to a novel class of selective solvents. In one of its more specific aspects it relates to the separation of members of different or the same hydrocarbon groups. In one specific embodiment the invention relates to the separation of aromatics, isoparaffins, n-paraffins, and cycloparaffins, preferentially in the order given, using aliphatic carboxylic acids in which the aliphatic group is completely fluorinated as the selective solvent.

The process of selective solvent extraction is not new. Numerous mixtures, especially of organic compounds, have been separated by solvents in which the difference in the solubility of the components of the mixture in a solvent is utilized to effect the separation. For example, the high viscosity index components of a lubricating oil have been separated from the low V. I. components by extraction of the latter with phenol, sulfur dioxide, hydrofluoric acid, and numerous other solvents. Close-boiling mixtures and azeotropic mixtures of organic and inorganic mixtures may also be effectively separated by the solvent extraction process where such separation cannot be made by ordinary fractionation. Because of the effectiveness of this process where many other processes are ineffective, solvent extraction is most useful.

In general, the process of selective solvent extraction is practiced by contacting the mixture to be separated with a selective solvent which has a limited solubility for the components of the mixture, separating the solvent phase and the raffinate phase, removing the solvent from each phase, and separately recovering the non-solvent portion of each phase. Both single-stage contacting and multi-stage contacting have been used, their use being determined by the ease of separation and by the degree of separation desired.

An object of this invention is to provide a new group of selective solvents.

Another object is to provide a new group of selective solvents for the separation of members of the same or different hydrocarbon groups.

Another object of this invention is to provide a new class of selective solvents for the separation of aromatics from isoparaffins, and/or n-paraffins, and/or cycloparaffins.

Another object of this invention is to provide a new class of selective solvents for the separation of isoparaffins from n-paraffins and/or cycloparaffins.

Another object of this invention is to provide a new class of selective solvents for the separation of n-paraffins from cycloparaffins.

A further object is to provide a new group of solvents for the separation of different hydrocarbons of the same hydrocarbon group.

Still another object is to provide a method for the separation of aromatics from isoparaffins and/or n-paraffins and/or cycloparaffins, isoparaffins from n-paraffins and/or cycloparaffins, and n-paraffins from cycloparaffins.

Other objects and advantages of my invention will be apparent to one skilled in the art from the following discussion and disclosure.

I have discovered a new class of selective solvents effective for the separation of hydrocarbons by type and the separation of hydrocarbons within a type. In the latter case the compound of lowest boiling point is the most soluble. These solvents are the aliphatic carboxylic acids in which the aliphatic group is completely fluorinated. In particular, these acids may contain not more than 7 carbon atoms in the aliphatic group. These solvents are effective for the separation of isoparaffins, n-paraffins and/or cycloparaffins and aromatics, isoparaffins and n-paraffins and/or cycloparaffins, and n-paraffins and cycloparaffins, and even members of the same group of different boiling points.

The exact limits of temperatures, ratio of solvent to mixture to be separated, and the like, vary with the particular mixture of hydrocarbons and the particular solvent utilized in making the separation. In general, however, the temperature at which the contacting is effected is between 0 and 150° F., and preferably between 50 and 125° F. As the process is carried out in liquid phase, pressure sufficient to maintain substantially liquid phase is employed in the contacting zone. The ratio of solvent to hydrocarbon is ordinarily between 20:1 to 1:10, although in some instances ratios outside these limits may be used.

This process can be carried out by contacting the solvent and hydrocarbon mixture in a packed tower, a system of pumps and settling chambers or other effective means. The extract and raffinate phases may then be freed of solvent by a system of fractionation, whereby the solvent and separated hydrocarbons are recovered and the separated hydrocarbons withdrawn as products of the process.

The solvents particularly included in the process of this invention are the alkyl carboxylic acids in which the alkyl group is completely fluorinated. Examples of these acids are trifluoroacetic acid, whose boiling point is about 165° F., and heptafluorobutyric acid, whose boiling point is 248° F., and other acids of this homologous series such as heptafluoroisobutyric acid, nonafluoro-2-methylbutanoic acid, and undecafluorohexanoic acid.

Although it is generally preferred to utilize the perfluoroacids containing not more than 7 carbon atoms in the aliphatic group, I do not wish to be limited to these acids alone, since heavier acids containing more than 7 carbon atoms can be used, particularly in admixture with the lower boiling acids.

Though the solvents of this invention are each useful for separation of a great number of specific mixtures of quite different boiling ranges, the individual solvents are not necessarily equivalent for any one separation. As the number of separations possible by the process of this invention is quite large, some experimentation with several individual solvents may be desirable in order to determine the most satisfactory one. In a few isolated cases a particular perfluoroacid will be infinitely miscible with one of the hydrocarbons to be separated. Such solubility characteristics limit the separation obtainable with this solvent in the extraction of such a specific hydrocarbon mixture. However, a perfluoroacid of greater or lesser number of carbon atoms per molecule, or sometimes merely a different chain configuration, will have satisfactory solubility characteristics to effect this separation.

As an illustration of the previous paragraph, I have found that trifluoroacetic acid and benzene are infinitely miscible even at quite low temperatures. Therefore, complete separation of a benzene-normal hexane mixture with trifluoroacetic acid is not possible, although partial separation is possible. However, these two hydrocarbons can be separated by use of the heptafluorobutyric acid, for this acid and either of these hydrocarbons are of limited miscibility even at 75° F.

Refer now to the attached drawing, which is a schematic flow diagram of one method for carrying out an extraction process utilizing my novel solvents. Various additional valves, pumps, and other conventional equipment necessary for the practice of this invention will be familiar to one skilled in the art and have been omitted from the drawing for the sake of clarity. Although the drawing represents one embodiment of my invention, various minor changes may be made in adapting the process to the various conditions within the scope of the invention.

The attached drawing is a schematic diagram of one specific embodiment of this invention. In this embodiment normal nonane and cumene are separated by the use of a perfluoroacid as the selective solvent. A mixture of normal nonane and cumene is introduced to the system through line 10 to extractor 11. The solvent acid is introduced at the top of extractor 11 from a source to be described, and reflux cumene is introduced at the bottom of the extractor through line 31. The solvent passes downward through the extractor and extracts cumene from the rising hydrocarbon and a liquid stream of nonane saturated with solvent is withdrawn from the top of the extractor through line 12 and introduced to fractionator 13. In the fractionator a mixture of normal nonane and solvent is carried overhead and the nonane substantially free of solvent is withdrawn as a kettle product through line 22 and is conducted to storage, not shown. The overhead mixture is withdrawn through line 14 and admixed with a similar stream from line 19 from a source to be described. The total stream is then conducted to separator 15 wherein an upper phase predominating in hydrocarbon and a lower phase of high solvent content separate. The upper phase is conducted through line 17 back to line 12, then following a previously described route. The lower phase is removed through line 16 and conducted to fractionator 18 wherefrom a mixture of normal nonane and solvent is removed through line 19 and conducted to line 14, then following a previously described route. Substantially pure solvent is removed as a kettle product through line 20. Alternatively, the material in line 16 withdrawn from separator 15 may be passed directly to line 20 by means not shown, thus by-passing fractionator 18.

The extract phase is removed from extractor 11 through line 23 and is conducted to fractionator 24. In this fractionator a mixture of cumene and solvent is separated as an overhead product and removed through line 25, a similar mixture is added to this stream through line 29 from a source to be described and the total stream conducted to separator 26. The liquid mixture separates herein into an upper phase predominating in hydrocarbons and a lower phase containing a high proportion of solvent. The upper phase is removed from separator 26 through line 27 and conducted to fractionator 28 wherein an overhead product mixture of cumene and solvent is separated, removed through line 29 and conducted to line 25, then following a previously described route. The lower phase in separator 26 is removed through line 32 and conducted back to line 23, joining a similar stream there and following a previously described route.

The kettle product of fractionator 24 is substantially pure solvent acid and is removed through line 34. The solvent carried by line 20 is joined by a make-up solvent stream added through line 21 and the total stream added to line 34, the entire solvent stream then conducted through line 34 and introduced to extractor 11 as previously described.

The kettle product of fractionator 28, which is substantially solvent free cumene, is removed through line 30 and a portion passed through line 31 to the lower portion of extractor 11 as reflux. The remainder of the stream is conducted through line 30 to storage as a product of the process.

The advantages of this invention are illustrated in the following example. The reactants and their proportions and other specific ingredients are presented as being typical and should not be construed to limit the invention unduly.

*Example*

| Hydrocarbon | Solvent | Volume Percent Hydrocarbon Dissolved in Extract Phase | Solution Temp., °F. |
|---|---|---|---|
| N-Nonane | Trifluoroacetic Acid | 5.0 | 50 |
| Cumene | ----do---- | 46.0 | 50 |
| Cyclohexane | ----do---- | 17.5 | 86 |
| N-Heptane | ----do---- | 23.5 | 86 |
| Do | Heptafluorobutyric Acid | 7.0 | 68 |
| Toluene | ----do---- | 41.5 | 68 |
| N-Heptane | Trifluoroacetic Acid | 13.5 | 53 |
| Iso-Octane | ----do---- | 50 | 53 |
| Toluene | ----do---- | 50 | −23 |

The above example clearly shows the high selectivity of the solvents of my invention for aromatics when in admixture with paraffins. It also shows a very outstanding selectivity for iso-paraffins over n-paraffins and n-paraffins over cycloparaffins. From the data it is also apparent due to the very high solubility for aromatics that aromatics are preferentially dissolved when in admixture with cycloparaffins. Thus, while the expected selectivity would be for aromatics over paraffins and for cycloparaffins over open chain paraffins, the above data show that the latter selectivity is actually reversed.

Although this process has been described and exemplified in terms of its preferred modifications, it is understood that various changes may be made without departing from the spirit and scope of the disclosure and of the claims.

I claim:

1. A method for the liquid phase separation of hydrocarbons which comprises solvent extracting a mixture of hydrocarbons with at least one aliphatic carboxylic acid in which the aliphatic group is completely fluorinated.

2. A method for the separation of a hydrocarbon mixture containing aromatic, isoparaffinic, n-paraffinic and cycloparaffinic hydrocarbon components which comprises solvent extracting said mixture with at least one aliphatic carboxylic acid in which the aliphatic group is completely fluorinated and recovering an extract phase enriched with respect to at least one of said hydrocarbon components.

3. A method according to claim 2 wherein the aliphatic group of the carboxylic acid contains not more than 7 carbon atoms per molecule.

4. A method according to claim 2 wherein the extraction process is carried out at a temperature of 0 to 150° F. and at a sufficient pressure to maintain liquid phase.

5. A method according to claim 2 wherein the extraction process is carried out at a temperature in the range of 50 to 125° F., a pressure sufficient to maintain liquid phase, and with a ratio of solvent to hydrocarbons in the range of 20:1 to 1:10.

6. A process according to claim 5 wherein the solvent extraction is carried out in countercurrent flow of solvent and mixture to be extracted.

7. A method for the separation of aromatics from isoparaffins, n-paraffins, and cycloparaffins, isoparaffins from n-paraffins and cycloparaffins, and n-paraffins from cycloparaffins, which comprises contacting a mixture to be separated with at least one aliphatic carboxylic acid in which the aliphatic group is completely fluorinated.

8. A method for the separation of a hydrocarbon mixture containing aromatic, isoparaffinic, n-paraffinic and cycloparaffinic hydrocarbon components, which comprises contacting said mixture with a solvent comprising at least one aliphatic carboxylic acid the aliphatic group of which is completely fluorinated, and carrying out the separation at a temperature in the range of 0 to 150° F., in liquid phase, and with a ratio of solvent to hydrocarbon mixture in the range of 20:1 to 1:10.

9. A method according to claim 8 wherein the separation is carried out at a temperature in the range of 50 to 125° F.

10. A method for the separation of a hydrocarbon mixture containing aromatic and paraffinic hydrocarbons which comprises solvent extracting said mixture with at least one aliphatic carboxylic acid in which the aliphatic group is completely fluorinated and recovering an extract phase enriched with respect to said aromatic component.

11. A method for the separation of a hydrocarbon mixture containing isoparaffinic and n-paraffinic hydrocarbon components which comprises solvent extracting said mixture with at least one aliphatic carboxylic acid in which the aliphatic group is completely fluorinated and recovering an extract phase enriched with respect to said isoparaffinic component.

12. A method for the separation of a hydrocarbon mixture containing n-paraffinic and cycloparaffinic hydrocarbon component which comprises solvent extracting said mixture with at least one aliphatic carboxylic acid in which the aliphatic group is completely fluorinated and recovering an extract phase enriched with respect to said paraffinic component.

13. A method for the separation of hydrocarbon mixture containing aromatic and cycloparaffinic hydrocarbon components which comprises solvent extracting said mixture with at least one aliphatic carboxylic acid in which the aliphatic group is completely fluorinated and recovering an extract phase enriched with respect to said aromatic component.

FORREST N. RUEHLEN.

REFERENCES CITED

The following references are of record in the file of this patent:

UNITED STATES PATENTS

| Number | Name | Date |
|---|---|---|
| 2,064,338 | Brown et al. | Dec. 15, 1936 |
| 2,162,682 | Terres et al. | June 13, 1939 |

FOREIGN PATENTS

| Number | Country | Date |
|---|---|---|
| 795,107 | France | Mar. 4, 1936 |
| 466,979 | Great Britain | June 9, 1937 |